Figure 1:
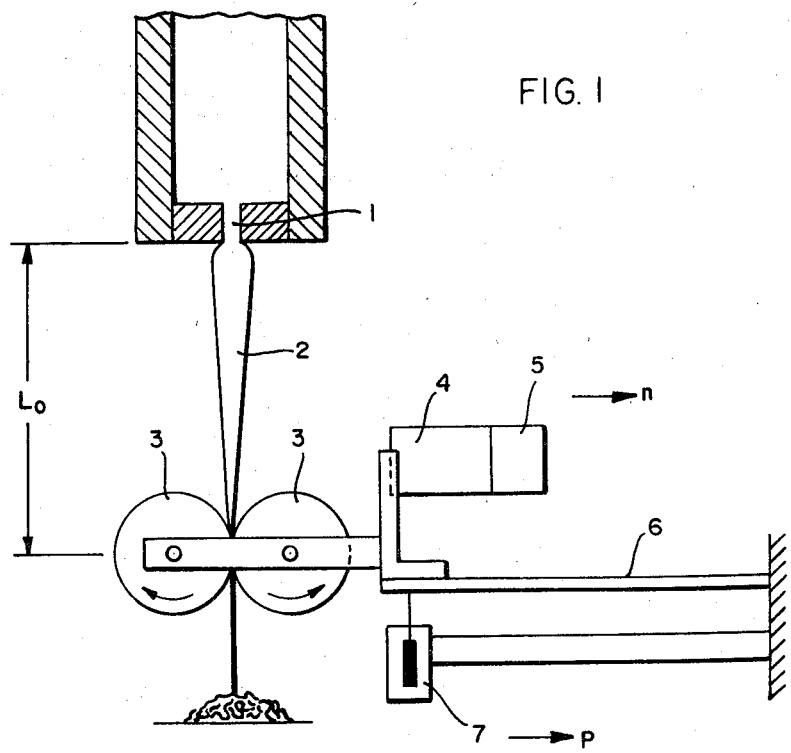

United States Patent

[11] 3,633,409

[72] Inventor Joachim Meissner
 Fussgonheim, Germany
[21] Appl. No. 5,841
[22] Filed Jan. 26, 1970
[45] Patented Jan. 11, 1972
[73] Assignee Badische Anilin- & Soda-Fabrik
 Aktiengesellschaft
 Ludwigshafen am Rhine, Germany
[32] Priority Jan. 28, 1969
[33] Germany
[31] P 19 04 079.0

[54] APPARATUS FOR THE DETERMINATION OF THE DEFORMATIONAL PROPERTIES OF DOUGHY MATERIALS, PASTES AND MELTS
 5 Claims, 2 Drawing Figs.
[52] U.S. Cl.................................................. 73/95.5,
 73/15.6, 73/169
[51] Int. Cl. ............................................... G01n 3/08
[50] Field of Search........................................... 73/95.5, 95,
 15.6, 143, 159, 160, 169

[56] References Cited
 UNITED STATES PATENTS
 942,006 11/1909 Morehead..................... 73/143

Primary Examiner—Jerry W. Myracle
Attorney—Johnston, Root, O'Keefe, Keil, Thompson & Shurtleff ABSTRACT: Apparatus for the determination of the viscoelastic properties and particularly of the elongation behavior of materials having consistencies ranging from those of doughs to those of melts, in which a pair of rollers attached to the end of a deflectable arm and driven at a variable speed applies pull to a descending strand of the material, and in which the force deflecting the arm at a given speed is continuously measured.

PATENTED JAN 11 1972 3,633,409

INVENTOR:
JOACHIM MEISSNER
BY
Johnston, Root, O'Keeffe, Keil, Thompson & Shurtleff
ATT'YS

APPARATUS FOR THE DETERMINATION OF THE DEFORMATIONAL PROPERTIES OF DOUGHY MATERIALS, PASTES AND MELTS

The invention relates generally to methods and means for the determination of the viscoelastic properties of substances having consistencies ranging from those of doughs to those of melts and more particularly to apparatus for determining the resistance to elongation of such substances, preferably of synthetic thermoplastics.

In certain methods of processing synthetic plastics, for instance in the coating of paper and textiles or in the production of plastics sheet material by the blown-bubble extrusion process, the highest production rate is determined by the maximum extensibility and tensile strength of the plastics melts used. There have hitherto been no simple methods or measurement for a rapid assessment of these properties of a synthetic plastic material.

In the Journal of the Technical Association of Pulp and Paper Industries (TAPPI), Vol. 50, No. 1, 1967, a method has been described in which the plastics strand issuing from the orifice of a capillary viscometer or an extruder is repeatedly deflected by rollers and taken to a drawoff means. In this arrangement several deflecting rollers are provided behind a pair of drawoff rollers and the force acting on the bearing of the first deflecting roller is measured and used as a measure of the tensile strength of the strand when the latter breaks. The distribution of the flow of forces between several drawoff and deflecting rollers in such an arrangement results in systematic measuring errors. Moreover, the arrangement is very long and the bearing load which is to be measured is adversely affected by elongations between the drawoff rollers and the first deflecting roller which is used for making the measurement. The arrangement is unsuitable for low-viscosity melts.

It is therefore an object of the present invention to provide an apparatus for the determination of the deformational properties of doughy materials, pastes and melts, particularly of plastics, which does not have the above-mentioned drawbacks and which can also be used for materials in the low-viscosity range.

According to this invention this object is achieved by the provision of a pair of substantially horizontally disposed drawoff rollers driven at variable speed and attached to an elastically mounted support, said roller applying tension to a strand of material moving substantially vertically downwards. In a preferred embodiment of the invention the pair of drawoff rollers which pull the strand of material and apply the elongating force, together with their associated driving motor and a speed-measuring signal generator, are attached to the free end of a leaf spring which is fixed at the other end in a substantially horizontal position.

Apparatus based on this kind of arrangement can be sufficiently small and compact to permit it to be easily located and fixed underneath any laboratory viscometer for measuring the viscosity of plastics melts, for instance underneath a melt viscometer of the kind frequently used for testing and production control.

The invention will be hereinafter described with reference to the drawing.

FIG. 1 schematically shows the orifice 1 of an instrument for testing melting indices. A strand of plastics descends from the orifice and is gripped in the plastic state in the nip of a pair of drawoff rollers 3 driven by a small motor 4 at varying speeds $n$, for instance at continuously varying speeds. The transmission between the motor shaft and the pair of rollers 3 is not shown in the drawing. Advantageously a speed measuring means is directly associated with the motor, preferably a signal generator which delivers an electrical voltage representing the existing speed $n$. A noncontactmaking pickup, such as an electro-optical device, may also be used.

Together with the driving motor 4 and possibly also the tachogenerator 5 the pair of drawoff rollers 3 is mounted at the free deflectable end of an cantilever arm 6 of which the other end is fixed in a clamping means. Preferably this arm may be a leaf spring which directly generates a restoring force. However, the arm could also have the form of a spring-loaded plate or lever hinged at one end. The deflectable end of the arm 6 is further fitted with a deflection reporting device 7, such as an inductive pickup which generates a signal representing the existing deflection. The signal from this pickup and the signal from the speed-reporting device 5 are used for controlling the X and Y deflections of a two-component pen recorder or some other display means or evaluating instrument of conventional kind.

Figure 2:
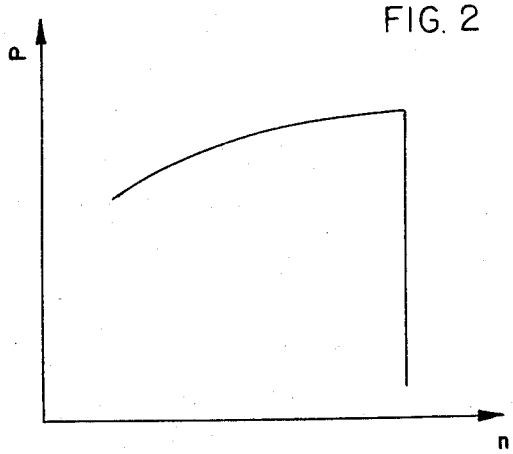

For determining the extensibility of the strand of viscous material the strand is passed between the pair of drawoff rollers 3. When the strand issuing from the nozzle 1 has assumed a steady state, the speed $n$ of the variable speed motor 4 is increased at a uniform rate until the strand breaks. During this test the deflecting force which is measured by the deflection pickup 7 and which is proportional to the force acting on the pair of drawoff rollers is continuously measured and plotted in the Y-direction by the recorder. It, at the same time the speed $n$ measured by the tachogenerator 5, is plotted in the X-direction a curve will be obtained such as that shown in FIG. 2. This can be used for an assessment of the elongation resistance of the material tested. The maximum power P in the diagram is a relative measure of the tensile strength, the maximum speed $n$ a measure of the extensibility of the material tested.

The above-described apparatus for determining the deformational properties of viscous materials can be used for instance for testing branched polyethylene. Values are thus obtained which are correlated to the maximum drawoff speeds which are obtained in processing and which are of essential importance for instance in the blown-bubble extrusion process. In the case of other plastics, e.g., polystyrene, the space defined by the distance $L_h$ between the orifice 1 and the pair of drawoff rollers 3 must be heated because polystyrene solidifies too quickly.

The application of the proposed arrangement is naturally not limited to its association with the orifice 1 of an instrument for measuring the melt index. The pair of drawoff rollers may also be arranged to draw away the extrudate issuing from a small extruder. Nor is the proposed arrangement exclusively suitable for testing synthetic plastic melts. It can also be used for other liquids possessing elasticity, for instance for assessing the extensibility of print pastes.

Another useful application of the proposed arrangement is the controlled stretching of sections or extrusions, for instance of filaments which issue from a spinning head in the viscous state and which are stretched as they are drawn away from the spinning nozzles. The measuring arrangement can then accurately control the stretching of the filament, the pulling force P being converted into an electrical voltage generated by the deflection pickup 7 and this signal being used for the purpose of control and regulation.

We claim:

1. Apparatus for determining the deformational properties of doughy or viscous materials by continuous stretching of a strand thereof, which comprises an elastically deflectable member having mounted thereon a pair of drawoff rollers adapted to stretch said strand as it is drawn through the nip of said rollers, means for driving said rollers at variable speeds of rotation, and means operatively associated with said deflectable member for continually measuring the elongation resistance force of said strand as it is drawn through the nip of said rollers at respective speeds of rotation thereof.

2. Apparatus as claimed in claim 1 wherein said support member comprises a substantially horizontal, elastically deflectable arm.

3. Apparatus as claimed in claim 2, said arm being a horizontal cantilever arm with said pair of rollers being mounted on the free, deflectable end of said arm.

4. Apparatus as claimed in claim 1, said last-mentioned means sensing amounts of deflection of said deflectable member at various speeds of rotation of said rollers.

5. Apparatus as claimed in claim 1, wherein said pair of rollers, said means for driving said rollers and said means for measuring the elongation resistance force of said strand are mounted on the free, deflectable end of said member.

* * * * *